(12) United States Patent
Huang

(10) Patent No.: US 9,203,232 B2
(45) Date of Patent: Dec. 1, 2015

(54) LEAKAGE DETECTION PROTECTIVE CIRCUIT

(76) Inventor: HuaDao Huang, Yueqing (CN)

( * ) Notice: Subject to any disclaimer, the term of this patent is extended or adjusted under 35 U.S.C. 154(b) by 1104 days.

(21) Appl. No.: 13/108,035

(22) Filed: May 16, 2011

(65) Prior Publication Data

US 2011/0273803 A1   Nov. 10, 2011

Related U.S. Application Data

(63) Continuation-in-part of application No. 12/774,565, filed on May 5, 2010, now Pat. No. 8,154,832.

(30) Foreign Application Priority Data

May 18, 2010  (CN) ...................... 2010 2 0199060 U

(51) Int. Cl.
  *H02H 3/00*  (2006.01)
  *H02H 3/33*  (2006.01)
  *H02H 3/04*  (2006.01)
(52) U.S. Cl.
  CPC . *H02H 3/334* (2013.01); *H02H 3/04* (2013.01)
(58) Field of Classification Search
  CPC ............................... H02H 3/335; H02H 3/338
  USPC .......................................................... 361/42
  See application file for complete search history.

(56) References Cited

U.S. PATENT DOCUMENTS

| 7,408,432 | B2 * | 8/2008 | Shi ................................. 335/17 |
| 7,423,854 | B2 * | 9/2008 | Gandolfi et al. ................ 361/42 |
| 7,869,171 | B2 * | 1/2011 | Weeks et al. .................... 361/42 |
| 7,940,498 | B2 * | 5/2011 | Huang ............................. 361/42 |
| 2005/0013069 | A1 * | 1/2005 | Aromin ........................... 361/42 |
| 2007/0188949 | A1 * | 8/2007 | Bonilla et al. .................. 361/42 |
| 2010/0073178 | A1 * | 3/2010 | Huang et al. .................. 340/664 |

* cited by examiner

*Primary Examiner* — Stephen W Jackson
*Assistant Examiner* — Ann Hoang
(74) *Attorney, Agent, or Firm* — Mei & Mark LLP

(57) ABSTRACT

The present invention relates generally to a leakage detection protective circuit. This leakage detection protective circuit includes a rectification circuit, a current-limiting resistance, a controlled silicon rectifier (SCR), a power supply main circuit switch linked with a reset button and a tripping coil with a built-in iron core. The rectification circuit, tripping coil, and SCR are connected in series with each other, forming a circuit. The control pole of the SCR is connected, through the current-limiting resistance and the diode, to the shielding layer of the power output wires. When a leakage failure occurs, the shielding layer connected to the control pole of the controlled silicon rectifier becomes electrified, triggering the controlled silicon rectifier. A magnetic field is then generated within the tripping coil and its built-in iron core moves, causing the reset button to trip. This invention is characterized by a compact circuit and robust operation.

20 Claims, 4 Drawing Sheets

LEAKAGE DETECTION PROTECTIVE CIRCUIT

CLAIM FOR PRIORITY

This application claims priority under 35 U.S.C. §119 to Chinese patent application No. 201020199060.8 filed May 18, 2010, the content of which is incorporated herein by reference in its entirety. This application is a continuation-in-part of U.S. application Ser. No. 12/774,565 entitled "Leak Detection and Leak Protection Circuit" filed May 5, 2010, the content of which is incorporated herein by reference in its entirety.

TECHNICAL FIELD

The present invention relates generally to a leakage detection protective circuit with leakage detection and protective functions, which is installed inside a power supply socket/plug with leakage protective functions. Specifically, this leakage detection protective circuit involves an energy-saving circuit with a simple circuit structure and a life termination detection function and a display function.

BACKGROUND

Along with the continuous development in the industry of power supply sockets/plugs with leakage protective functions, such as ground fault circuit interrupters (GFCI), even higher requirements are proposed for their function, safety and reliability. This drives industry participants to study and improve the leakage detection protective circuits installed in leakage protective sockets/plugs, resulting in more compact circuits, more robust functions and more reliable operation.

SUMMARY

For the above reasons, one of the goals is to provide a leakage detection protective circuit with a compact circuit and a life termination detection function. Another goal of this leakage detection protective circuit is to provide a display function. A further goal is to provide an energy-saving circuit.

To realize the above goals, the leakage detection protective circuit comprises a live power output wire, a neutral power output wire, a power input end, a rectification circuit, a first current limiting resistance, a second current limiting resistance, a diode, a controlled silicon rectifier, a pair of power supply main circuit switches, a reset button and a tripping coil with a built-in iron core. A shielding layer is included on the live and neutral power output wires. The power input end comprises a live wire and a neutral wire. The rectification circuit comprises a pair of AC input ends and a DC power output end comprising a positive pole and a negative pole. The controlled silicon rectifier comprises a cathode, an anode, and a control pole.

The pair of power supply main circuit switches are linked to the reset button. Additionally, the cathode of the controlled silicon rectifier is connected to the negative pole of the DC power output end of the rectification circuit. The anode of the controlled silicon rectifier is connected, through the tripping coil, to the positive pole of the DC power output end of the rectification circuit. The control pole of the controlled silicon rectifier is connected, through the first current-limiting resistance, the diode, and the second current limiting resistance, to the shielding layer of the power output wires.

This leakage detection protective circuit has the advantages of a compact circuit and low manufacturing costs. Additionally, when the reset button is in a tripped state, the entire leakage detection protective circuit is not electrified. Only when the reset button is pressed and the reset button is reset will the entire leakage detection protective circuit be electrified and operate. Therefore, it can save electrical energy, prolong the service life of electrical components, and subsequently prolong the service life of the entire leakage detection protective circuit.

BRIEF DESCRIPTION OF THE DRAWINGS

The accompanying drawings, which are incorporated in and constitute a part of this specification, illustrate several embodiments and together with the description, serve to explain the principles of the leakage detection protective circuit.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
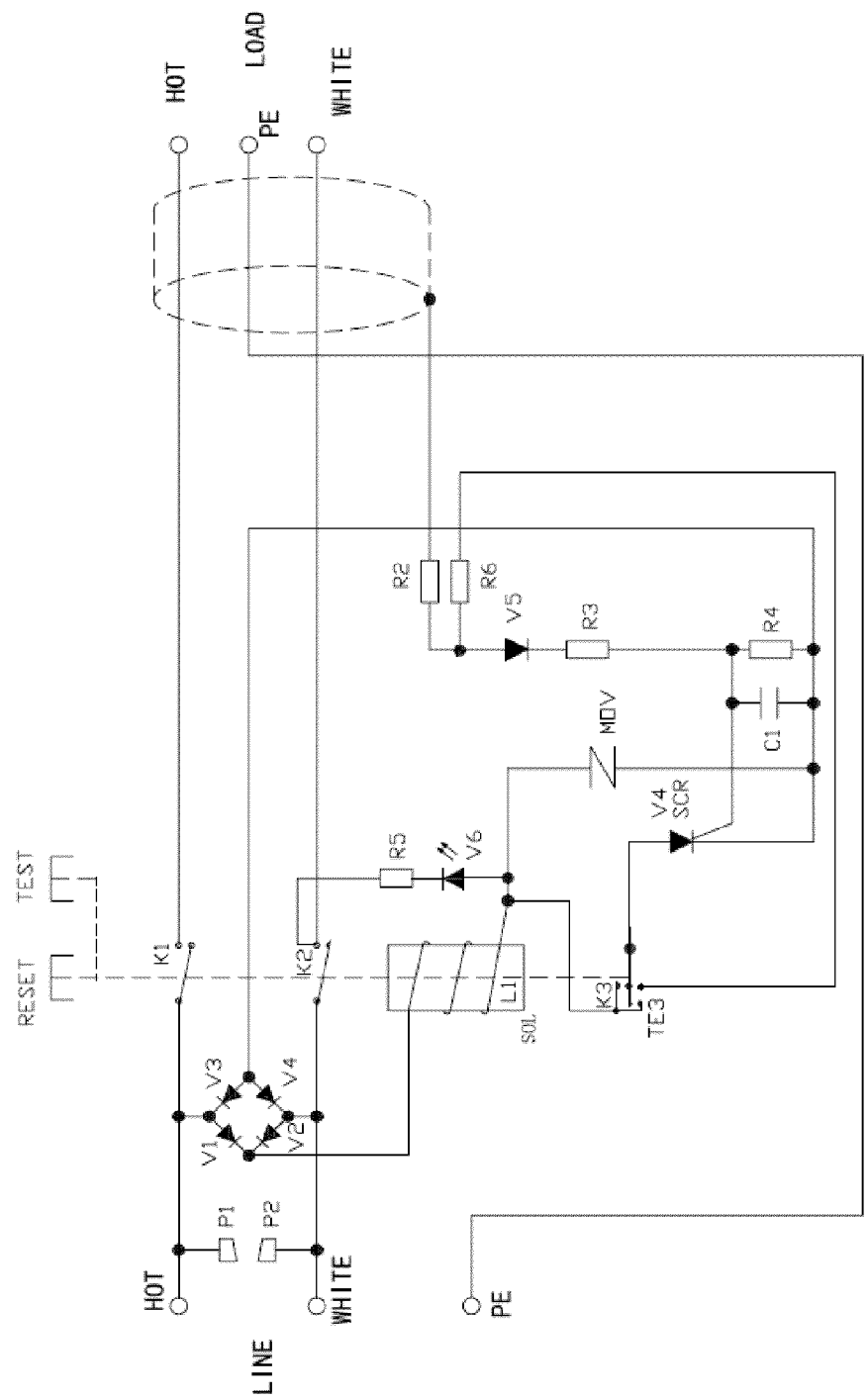
FIG. 1 is a circuit diagram of Embodiment 1 of the leakage detection protective circuit.

FIG. 1 is the specific circuit diagram of Embodiment 1 of the leakage detection protective circuit, which is installed inside the power supply socket/plug with leakage protective functions. As shown in FIG. 1, this leakage detection protective circuit is composed of a rectification circuit V1-V4, current-limiting resistors R2, R6, R3, R4, diode V5, controlled silicon rectifier SCR, tripping coil L1 (SOL) with a built-in iron core, power supply main circuit switches K1 and K2 linked with the reset button RESET, power supply switch K3 linked with the reset button RESET and life termination detection switch TE3.

The action of the iron core built into tripping coil L1 can make the reset button RESET reset or trip.

The cathode of the controlled silicon rectifier SCR is connected to the negative pole of the DC power output end of the rectification circuit V1-V4. The anode of the controlled silicon rectifier SCR is connected, through the power supply switch K3 linked with the reset button RESET and through the tripping coil L1, to the positive pole of the DC power output end of the rectification circuit V1-V4. The anode of the controlled silicon rectifier SCR is also connected, through the life termination detection switch TE3 linked with the reset button RESET and through the tripping coil L1, to the positive pole of the DC power output end of the rectification circuit V1-V4.

The control pole of the controlled silicon rectifier SCR is connected, through the current-limiting resistor R3, diode V5 and current-limiting resistor R2, to a shielding layer of the power output wires of the power supply socket/plug. The control pole of the controlled silicon rectifier SCR is also connected, through current-limiting resistor R3, diode V5, current-limiting resistor R6 and life termination detection switch TE3 linked with the reset button RESET, to the positive pole of the DC power output end of the rectification circuit V1-V4.

The power supply output LOAD live wire HOT, neutral wire WHITE and safety grounding wire PE of the power supply socket/plug are all wrapped in the shielding layer. This shielding layer is formed by weaving alloy wires composed of copper, iron, etc. When a leakage phenomenon exists in the power socket/plug, the current of the working load is high, causing the plastic protective sleeve that wraps the power supply live wire, neutral wire or safety grounding wire starts to soften and melt. This causes the insulation layer to be damaged and to contact the shielding layer, electrifying the shielding layer. Therefore, when the shielding layer is electrified, it can be determined quickly and accurately that a leakage failure exists in the power supply socket/plug.

Between the control pole and cathode of the controlled silicon rectifier SCR, resistor R4 and capacitor C1 are connected in parallel.

When the reset button RESET is in a tripped state, the power supply switch K3 linked with the reset button RESET, the life termination detection switch TE3, and the power supply main circuit switches K1 and K2 are all in an open (disconnected) state.

When the reset button RESET is pressed, the life termination detection switch TE3 linked with the reset button RESET is closed. The power supply switch K3 linked with the reset button RESET and the power supply main circuit switches K1 and K2 remain in an open state. Because the life termination detection switch TE3 is closed, the anode of the controlled silicon rectifier SCR is connected, through the closed life termination detection switch TE3 and the tripping coil L1, with the positive pole of the DC power output end of the rectification circuit. The cathode of the controlled silicon rectifier SCR is connected with the negative pole of the DC power output end of the rectification circuit. The control pole of the controlled silicon rectifier SCR is also connected, through the current-limiting resistor R3, the diode V5 and the closed life termination detection switch TE3, with the positive pole of the DC power output end of the rectification circuit. If the life of the leakage detection protective circuit has not terminated, the controlled silicon rectifier SCR will break over and current will flow through the tripping coil L1. The tripping coil L1 will generate a magnetic field, and the built in iron core will move, allowing the reset button RESET to reset. Conversely, if the life of the leakage detection protective circuit has terminated, no current will flow through tripping coil L1. Thus no magnetic field will be generated in the tripping coil L1, the built in iron core will not move, and the reset button RESET cannot be reset. In such a manner, the leakage detection protective circuit carries out the life termination detection.

When the reset button RESET is in a reset state, the power supply switch K3 linked with the reset button RESET and the power supply main circuit switches K1 and K2 will be in a closed state, and the life termination detection switch TE3 linked with the reset button RESET changes from a closed state to an open state. The leakage detection protective circuit power output end LOAD has power output. If a leakage phenomenon (leakage failure) exists in the power supply circuit, the shielding layer becomes electrified, the control pole of the controlled silicon rectifier SCR is at a high voltage, the controlled silicon rectifier SCR breaks over, current flows through the tripping coil L1, a magnetic field is generated in the tripping coil L1, the built in iron core moves, the reset button RESET becomes tripped, breaking the switches K1 and K2 in the power supply socket/plug circuit linked with the reset button RESET, and allowing no power output in the power supply socket/plug.

To display the status of the leakage detection protective circuit/power supply socket/plug, a display circuit is also included. This display circuit is composed of series resistor R5 and work indicator V6. One end of the display circuit is connected, through the tripping coil L1, with the positive pole of the DC power supply of the rectification circuit. The other end of the display circuit is connected with the neutral wire of the power output end of the leakage detection protective circuit.

When the reset button RESET resets, the power supply main circuit switches K1 and K2 linked with the reset button RESET close and the power output end LOAD of the leakage detection protective circuit has power output. Current will then flow through the display circuit and the work indicator V6 will be on. When the reset button RESET is pressed or is in a tripped state, the power supply main circuit switches K1 and K2 linked with the reset button RESET are in an open state. Thus no current will flow through the display circuit and the work indicator V6 will be off.

When the live wire HOT and neutral wire WHITE of the power input end LINE of the leakage detection protective circuit are connected properly with the power supply hot wire and neutral wire in the wall, pressing the reset button RESET performs a life termination test. The life termination detection switch TE3 linked with the reset button RESET will be closed, while the power supply switch K3 and the power supply main circuit switches K1 and K2 will be opened. At this time, the leakage detection protective circuit carries out life termination detection. If the life of the leakage detection protective circuit has not terminated, the reset button RESET can reset. If the life of the leakage detection protective circuit has terminated, the reset button cannot be reset.

When the reset button RESET is in a reset state, the power supply switch K3 and the power supply main circuit switches K1 and K2 are closed, while the life termination detection switch TE3 is open. If, at this moment, a leakage failure exists in the power supply circuit of the power supply socket/plug, the controlled silicon rectifier SCR will be triggered and break over immediately, a magnetic field will be generated in the tripping coil L1, and the built-in iron core will move. The reset button RESET will then trip, the switches K1, K2, K3, which are all linked with the reset button RESET, are opened and the power supply socket/plug has no power output.

As shown in FIG. 1, the power supply switch K3 and the life termination detection switch TE3 are linked not only with the reset button RESET but also with the test button TEST. When the test button TEST is pressed, the power supply switch K3 is opened while the life termination detection switch TE3 is closed.

When the reset button REST is in a reset state, the power supply switch K3 and the power supply main circuit switches K1 and K2 are closed, the life termination detection switch TE3 is open, and the power output end of the leakage detection protective circuit has power output. If termination of the power output to the power output end is desired, the test button TEST is pressed. This makes the power supply switch K3 open and the life termination detection switch TE3 close. Because the life termination detection switch K3 is closed, the anode of the controlled silicon rectifier SCR is connected, through the closed life termination detection switch K3 and the tripping coil L1, with the positive pole of the DC power output end of the rectification circuit. The cathode of the controlled silicon rectifier SCR is connected with the negative pole of the DC power output end of the rectification circuit. The control pole of the controlled silicon rectifier SCR is connected, through the current-limiting resistor R3, diode V5, resistor R6 and the closed life termination detection switch TE3, with the positive pole of the DC power output end of the rectification circuit. Thus the controlled silicon rectifier SCR breaks over. Current flows in the tripping coil L1. A magnetic field is generated in the tripping coil L1. Its built-in iron core moves, making the reset button RESET trip and the power supply main circuit switches K1 and K2 open. The leakage detection protective circuit/power supply socket/plug then has no power output.

As shown in FIG. 1, the rectification circuit is a bridge rectification circuit composed of diodes V1-V4. Its AC power input end is connected with the live wire HOT and neutral wire WHITE of the input end LINE of the leakage detection protective circuit.

To improve the service life of the leakage protective socket/plug and to prevent damage to the power supply socket/plug resulting from an instant high voltage caused by a lightning strike or other reasons, rectangular or right trapezoidal discharge sheet metals P1 and P2 for discharging high voltages are connected to the live wire HOT and neutral wire WHITE respectively, as shown in FIG. 1. The tips of the two discharge sheet metals P1 and P2 are placed slantways relative to each other with a certain spacing maintained. The distance between them is smaller at an upper part than at a lower part.

A voltage dependent resistor MOV is connected in parallel between the anode and cathode of the controlled silicon rectifier SCR.

When the instant high voltage caused by a lightning strike or other reasons acts upon the power supply socket/plug, the air medium between the discharge sheet metal P1 connected to the live wire of the input end and the discharge sheet metal P2 connected to the neutral wire of the input end is broken down, forming an air discharge. Most of the high voltage is consumed through the discharge sheet metals, while a remaining small part is consumed through the tripping coil SOL and the voltage dependent resistor MOV. Thus the power supply socket/plug is protected against instant high voltages.

In the first embodiment, for the voltage dependent resistor MOV, a surge-inhibition type voltage dependent resistor is adopted. So it also has the function of preventing electrophoresis.

Figure 2:
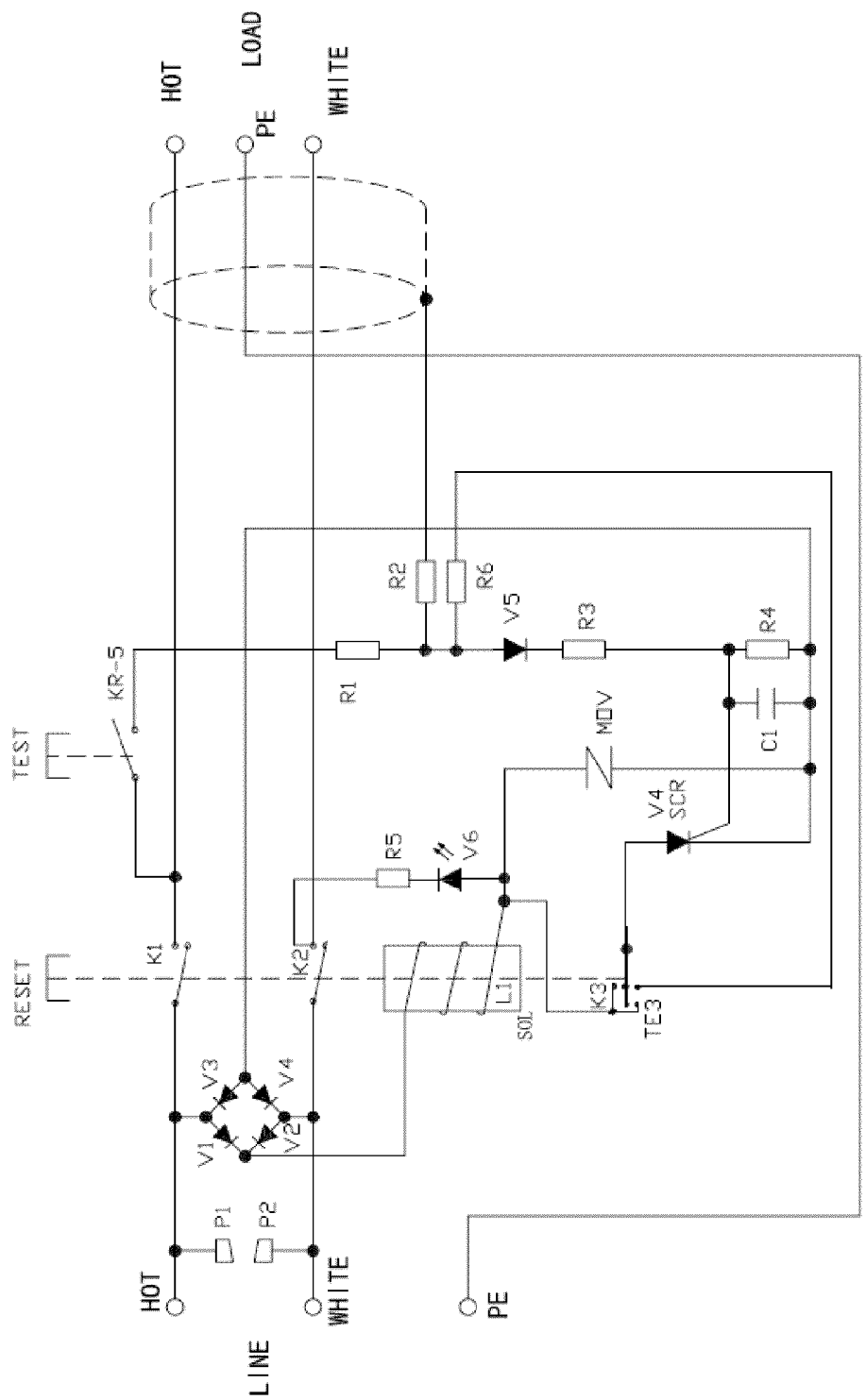
FIG. 2 is a circuit diagram of Embodiment 2 of the leakage detection protective circuit.

FIG. 2 is a circuit diagram of Embodiment 2 of the leakage detection protective circuit. Its difference from Embodiment 1 shown in FIG. 1 is that this leakage detection protective circuit also includes an analog leakage current generation switch KR-5 linked with the test button TEST. One end of this analog leakage current generation switch KR-5 is connected to the live wire or zero (neutral) wire of the power output end LOAD of the leakage detection protective circuit. The other end is connected, through the current-limiting resistor R1, diode V5 and current-limiting resistor R3, to the control pole of the controlled silicon rectifier SCR. In an alternative to this embodiment, one end of this analog leakage current generation switch KR-5 is connected to the neutral wire of the power output end LOAD of the leakage detection protective circuit.

If the user wants to cut off the leakage protective circuit while the leakage detection protective circuit is operating normally, as shown in FIG. 2, the test button TEST is pressed manually to make the analog leakage current generation switch KR-5 close. The control pole of the controlled silicon rectifier SCR is connected, through the current-limiting resistor R3, diode V5 and current-limiting resistor R1, with the live wire of the power output end, and is at a high voltage. The controlled silicon rectifier SCR then breaks over. Current flows in the tripping coil L1, and a magnetic field is generated. The built-in iron core moves, causing the reset button RESET to trip and make the power supply main circuit switches K1 and K2, which are linked with it, open. The leakage detection protective circuit will then have no power output.

Figure 3:
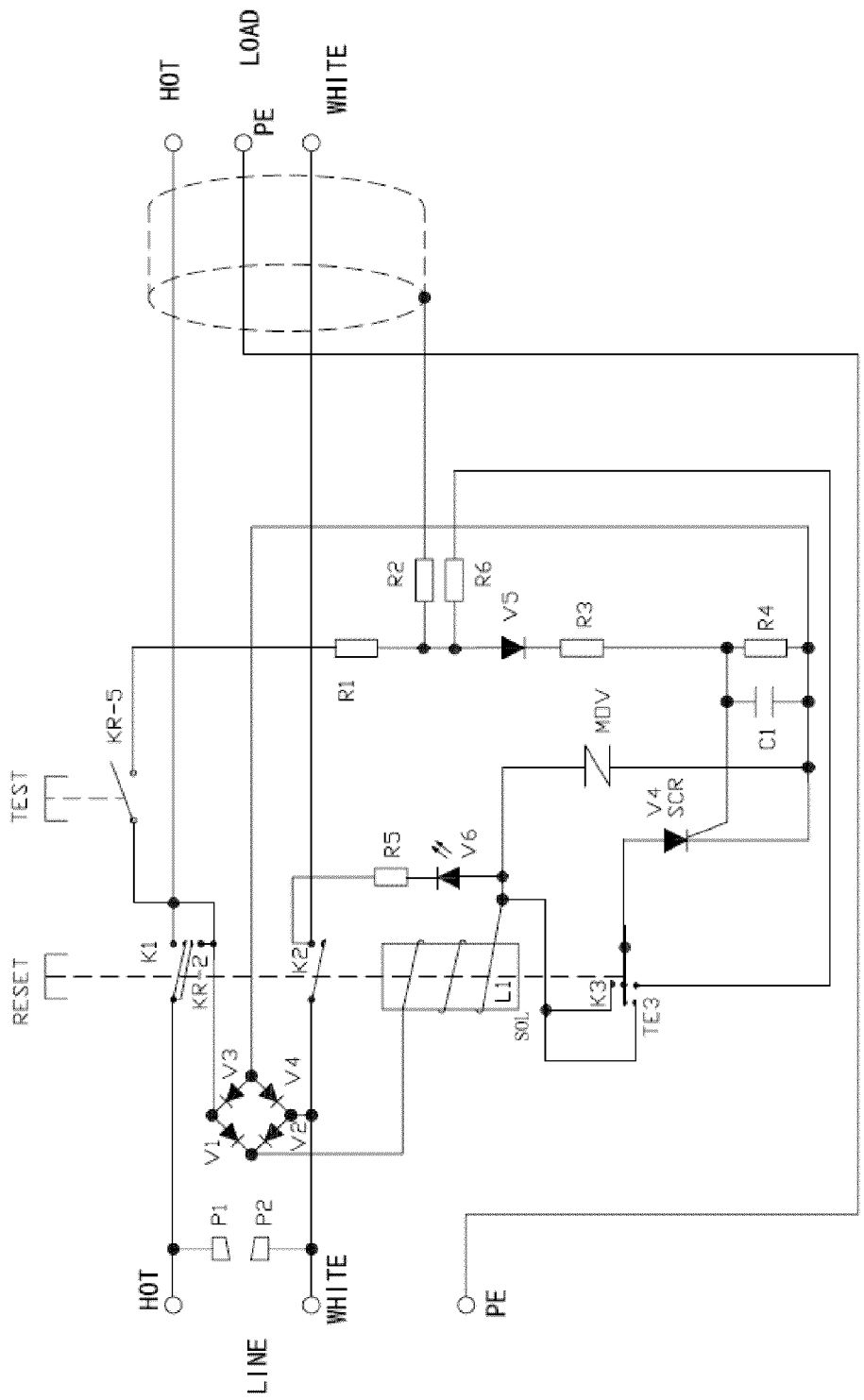
FIG. 3 is a circuit diagram of Embodiment 3 of the leakage detection protective circuit.

FIG. 3 is a circuit diagram of Embodiment 3 of the leakage detection protective circuit. Its main differences from Embodiment 2 shown in FIG. 2 and Embodiment 1 shown in FIG. 1 are as follows: This Embodiment is also designed with a master power switch KR-2. One end of the master power switch KR-2 is connected to the live wire of the power input end of the leakage detection protective circuit, while another end is connected with an AC power input end of the rectification circuit V1-V4. Meanwhile, this AC power input end of the rectification circuit V1-V4 is also connected with the live wire of the power output end of the leakage detection protective circuit. This master power switch KR-2 is linked with the reset button RESET. When the reset button RESET is pressed, the master power switch KR-2 closes. When the reset button is in a tripped state, this master power switch KR-2 opens.

When the reset button RESET is in a tripped state, the master power switch KR-2 opens. The rectification circuit V1-V4, which provides the whole leakage detection protective circuit with power supply, does not work, and thus the whole leakage detection protective circuit is not electrified. When the reset button RESET is pressed, the master power switch KR-2 closes, the rectification circuit V1-V4 works, and the whole leakage detection protective circuit is electrified and can work. When the reset button resets, the power supply main circuit switch K1 closes, the power output end of the leakage detection protective circuit has power output and provides the rectification circuit V1-V4 with power supply from the power output end.

The advantages of this design are as follows: When the reset button is in a tripped state, the whole leakage detection protective circuit is not electrified. Only when the reset button is pressed and the reset button is reset will the whole leakage detection protective circuit be electrified for operation. Therefore, this design can save electrical energy, prolong the service life of electrical components, and subsequently prolong the service life of the whole leakage detection protective circuit.

In an alternative design of Embodiment 3, the master power switch KR-2 can connect to the neutral wire of the power input end of the leakage detection protective circuit, while another end is connected with an AC power input end of the rectification circuit V1-V4.

Figure 4:
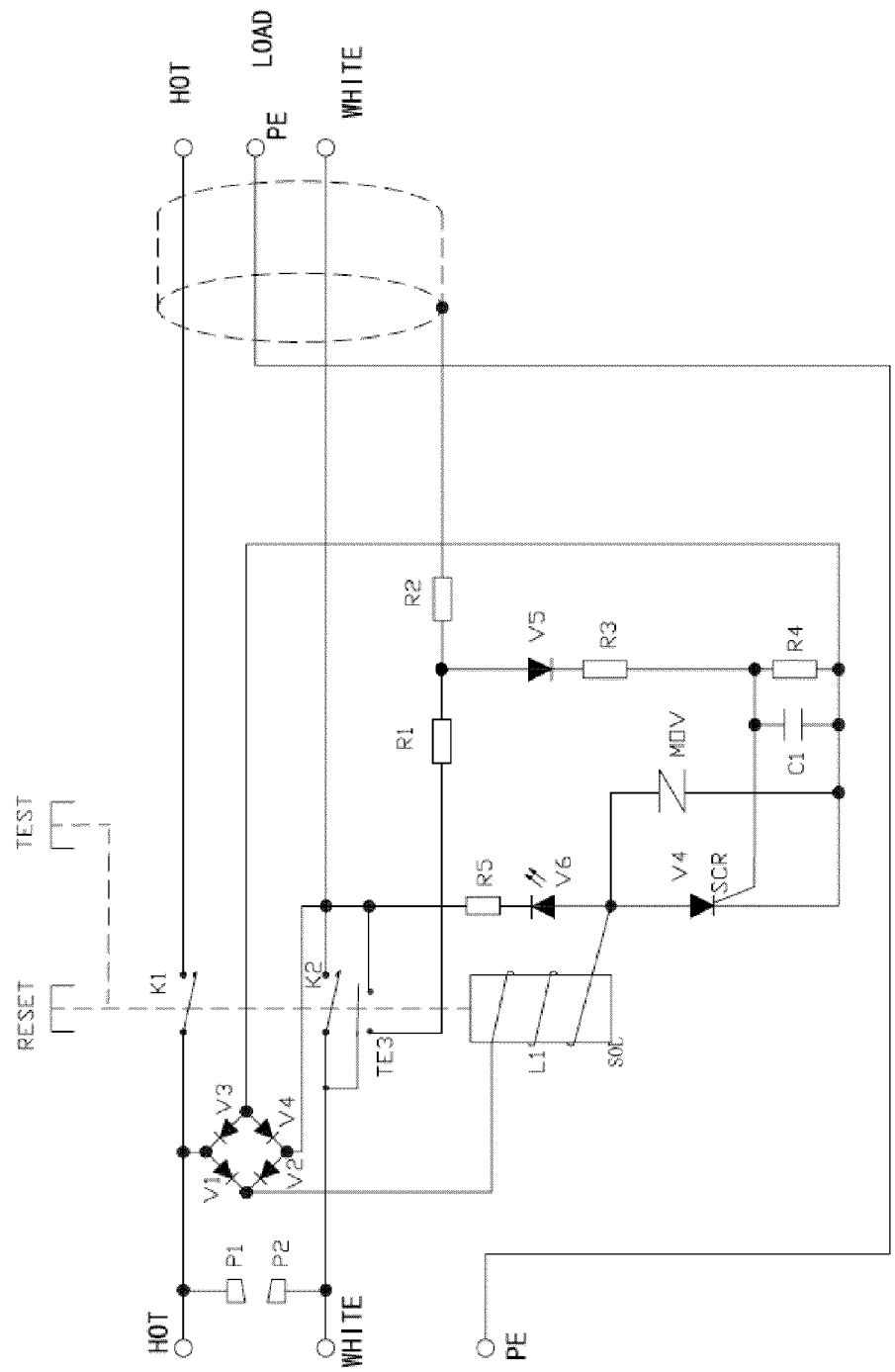
FIG. 4 is a circuit diagram of Embodiment 4 of the leakage detection protective circuit.

FIG. 4 is a circuit diagram of Embodiment 4 of the leakage detection protective circuit, which is installed inside a power supply socket/plug with leakage protective function. As compared with the leakage detection protective circuits shown in FIGS. 1-3, the leakage detection protective circuit shown in FIG. 4 is more compact.

As shown in FIG. 4, this leakage detection protective circuit is composed of rectification circuit V1-V4, current-limiting resistor R2, R6, R3, R4, diode V5, controlled silicon rectifier SCR, tripping coil L1 (SOL) with a built-in iron core, and power supply main circuit switches K1 and K2 linked with the reset button RESET.

The action of the iron core built into tripping coil L1 can make the reset button RESET reset or trip.

The cathode of the controlled silicon rectifier SCR is connected with the negative pole of the DC power output end of the rectification circuit V1-V4. The anode of the controlled silicon rectifier SCR is connected, through the tripping coil L1, with the positive pole of the DC power output end of the rectification circuit V1-V4.

The control pole of the controlled silicon rectifier SCR is connected, through the current-limiting resistor R3, diode V5 and current-limiting resistor R2, with the shielding layer of the power output wires of the power supply socket/plug.

The power supply output live wire HOT, neutral wire WHITE and safety grounding wire PE of the power supply socket/plug are all wrapped in the shielding layer. This shielding layer is formed by weaving alloy wires composed of copper, iron, etc. When a leakage phenomenon exists with the power socket/plug, the current of the working load is high, causing the plastic protective sleeve that wraps the power supply live wire, neutral wire or safety grounding wire starts to soften and melt. This causes the insulation layer to be damaged and to contact with the shielding layer, electrifying the shielding layer. Therefore, when the shielding layer is electrified, it can be determined quickly and accurately that a leakage failure exists in the power supply socket/plug.

Between the control pole and cathode of the controlled silicon SCR, resistor R4 and capacitor C1 are connected in parallel.

To save electrical energy and to prolong the service life of the electrical components, as shown in FIG. 4, an AC power input end of the rectification circuit V1-V4 which provides the whole leakage detection protective circuit with DC power supply is connected with the live wire of the power input end of the leakage detection protective circuit, while another AC power input end of the rectification circuit V1-V4 is connected with the neutral wire of the power output end of the leakage detection protective circuit.

As shown in FIG. 4, this leakage detection protective circuit also includes a life termination detection switch TE3 linked with the reset button and the test button. The neutral wire of the power input end of the leakage detection protective circuit is connected, through the life termination detection switch TE3, to another AC power input end of the rectification circuit V1-V4.

As shown in FIG. 4, when the reset button RESET is in a tripped state, the power supply main circuit switches K1 and K2 linked with the reset button RESET and the life termination detection switch TE3 are in an open state. The rectification circuit V1-V4 that provides the whole leakage detection protective circuit with power supply does not work. Thus the entire leakage detection protective circuit is not electrified. When the reset button RESET is pressed, the life termination detection switch TE3 closes. The neutral wire of the power input end is connected, through the closed life termination detection switch TE3, with the AC power input end of the rectification circuit V1-V4. The rectification circuit V1-V4 works. The entire leakage detection protective circuit is electrified and can operate. When the reset button is reset, the life termination detection switch TE3 opens, the power supply main circuit switch K2 closes, and the power output end of the leakage detection protective circuit has power supply. Power is supplied to rectification circuit V1-V4 from the power output end.

To display the status of the leakage detection protective circuit/power supply socket/plug, a display circuit is also included. The display circuit is composed of series resistor R5 and work indicator V6. One end of the display circuit is connected, through the tripping coil L1, to the positive pole of the DC power supply of the rectification circuit. The other end of the display circuit is connected to the neutral wire of the power output end of the leakage detection protective circuit.

When the reset button RESET resets, the power supply main circuit switches K1 and K2 linked with the reset button RESET closes and the power output end LOAD of the leakage detection protective circuit has power output, current will flow through the display circuit and the work indicator V6 is on. When the reset button RESET is in a tripped state, the power supply main circuit switches K1 and K2 linked with the reset button RESET is in an open state, no current will flow through the display circuit and the work indicator V6 is off.

In order to test whether the leakage detection protective circuit is operating normally when the circuit is in fact operating normally, the test button is depressed to a first position and the life termination detection switch will be closed. If the life of this circuit has not terminated, the controlled silicon rectifier will break over, the tripping coil will generate a magnetic field, and the iron core will move. If the life of this circuit has terminated, neither the controlled silicon rectifier nor the tripping coil iron core will react. The user could press the test button to a second position to force mechanical tripping.

In order to test whether the life of the leakage detection protective circuit has terminated, or to cut off the power output of the power output end of the leakage protective circuit while the leakage detection protective circuit is operating normally, as shown in FIG. 4, this leakage detection protective circuit also includes a life termination detection switch TE3 linked with the test button TEST. One end of this life termination detection switch TE3 is connected to the neutral wire of the power output end LOAD of the leakage detection protective circuit. Another end is connected, through the current-limiting resistor R1, diode V5 and current-limiting resistor R3, to the control pole of the controlled silicon rectifier SCR. The common end of the life termination detection switch TE3 is connected with the neutral wire of the power input end.

As shown in FIG. 4, manually depressing the test button TEST closes the life termination detection switch TE3. The control pole of the controlled silicon rectifier SCR is then connected, through the current-limiting resistor R1, diode V5 and current-limiting resistor R3, to the neutral wire of the power output end. Because the output end of the leakage detection protective circuit outputs AC power supply, when the control pole of the controlled silicon rectifier is at a high voltage level, the controlled silicon rectifier SCR breaks over. Current flows in the tripping coil L1 and a magnetic field is generated. Its built-in iron core moves to make the reset button RESET trip, opening the power supply main circuit switches K1 and K2 linked with it, and prevents power output from the leakage detection protective circuit. On the other hand, by pressing the test button TEST and by observing the action of the reset button, it can be determined whether the life of this leakage detection protective circuit has terminated.

To summarize the above, the leakage protective circuit has the following outstanding advantages: The circuit structure is simple and the manufacturing cost is low. It can save energy and prolong the service life of its electrical components.

Although the foregoing invention has been described in detail by way of illustration and example for purposes of clarity of understanding, it will be readily apparent to those of ordinary skill in the art in light of the description herein that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

In the preceding specification, various preferred embodiments have been described with reference to the accompanying drawings. It will, however, be evident that various other modifications and changes may be made thereto, and additional embodiments may be implemented, without departing from the broader scope of the claims that follow. The specification and drawings are accordingly to be regarded in an illustrative rather than restrictive sense.

I claim:

1. A leakage detection protective circuit comprising:
   a live power output wire;
   a neutral power output wire;
   a shielding layer on at least the live power output wire and the neutral power output wire;
   a power input end comprising:
      a live wire; and
      a neutral wire;
   a rectification circuit comprising:
      a pair of AC input ends; and
      a DC power output end comprising a positive pole and a negative pole;
   a first current-limiting resistance;
   a second current limiting resistance;
   a diode;
   a controlled silicon rectifier comprising:
      a cathode;
      an anode; and
      a control pole;
   a pair of power supply main circuit switches;
   a reset button;
   a power supply switch linked with the reset button;
   a life termination detection switch linked with the reset button; and
   a tripping coil with a built-in iron core;
   wherein:
   the pair of power supply main circuit switches are linked with the reset button;
   the cathode of the controlled silicon rectifier is connected to the negative pole of the DC power output end of the rectification circuit,
   the anode of the controlled silicon rectifier is connected, through the power supply switch and the tripping coil, to the positive pole of the DC power output end of the rectification circuit,
   the control pole of the controlled silicon rectifier is connected, through the first current-limiting resistance, the diode, and the second current limiting resistance, to the shielding layer of the power output wires,
   the anode of the controlled silicon rectifier is connected, through the life termination detection switch and the tripping coil, to the positive pole of the DC power output end of the rectification circuit,
   the control pole of the controlled silicon rectifier is further connected, through the first current limiting resistance, the diode, a third current limiting resistance, and the life termination detection switch, to the positive pole of the DC power output end of the rectification circuit,
   the leakage detection protective circuit is configured so that when the reset button is in a tripped state, the power supply switch, the life termination detection switch, and the pair of power supply main circuit switches are all in an open state,
   the leakage detection protective circuit is configured so that when the reset button is pressed after the tripped state, the life termination detection switch closes, the power supply switch and the pair of power supply main circuit switches are in an open state, and the leakage detection protective circuit carries out a life termination detection configured to allow the reset button to be reset if a life of the leakage detection protective circuit has not terminated, and to prevent the reset button from being reset if the life of the leakage detection protective circuit has terminated, and
   the leakage detection protective circuit is configured so that when the life termination detection indicates that the life of the leakage detection protective circuit has not terminated, the power supply switch and the pair of power supply main circuit switches are in a closed status, the life termination detection switch changes from a closed state to an open state, and the live power output wire and the neutral power output wire are configured to have power.

2. The leakage detection protective circuit of claim 1 further comprising a master power switch, wherein:
   the master power switch has a first end and a second end, and the first end is connected to either the live wire or the neutral wire of the power input end and the second end is connected to one end of the pair of AC input ends of the rectification circuit,
   the rectification circuit operates and electrifies the entire leakage detection protective circuit, providing it with power and allowing power to be output, when the master power switch is closed, and
   the entire leakage detection protective circuit is not electrified when the master power switch is open.

3. The leakage detection protective circuit of claim 1 further comprising a test button, wherein:
   the power supply switch and the life termination detection switch are further linked with the test button, and
   when the test button is depressed, the power supply switch changes from a closed state to an open state and the life termination detection switch changes from an open state to a closed state.

4. The leakage detection protective circuit of claim 1 further comprising:
   a display circuit, the display circuit comprising:
      a series resistor;
      a work indicator;
      a first end; and
      a second end,
   wherein:
   the first end of the display circuit is connected, through the tripping coil, to the positive pole of the DC power supply of the rectification circuit,
   the second end of the display circuit is connected to the neutral power output wire,
   the leakage detection protective circuit is configured so that when the reset button resets the leakage detection protective circuit, the live power output wire receives power and the work indicator is on, and
   the leakage detection protective circuit is configured so that when the reset button is in a tripped state, the work indicator is off.

5. The leakage detection protective circuit of claim 1 further comprising:
   an analog leakage current generation switch linked with the test button, the analog leakage current generation switch comprising a first end and a second end,
   wherein:
   the first end of the analog leakage current generation switch is connected to either the live power output wire or the neutral power output wire, and
   the second end of the analog leakage current generation switch is connected, through a leakage resistor, the diode, and the first current limiting resistance, to the control pole of the controlled silicon rectifier.

6. The leakage detection protective circuit of claim 1 further comprising:
   a pair of rectangular or right trapezoidal discharge sheet metals, one of which is connected to the live wire of the power input end, and the other of which is connected to the neutral wire of the power input end, wherein the pair of discharge sheet metals are arranged slantways relatively with a certain spacing and comprise a pair of tips, wherein the distance between the pair of discharge sheet metals is smallest at the pair of tips.

7. The leakage detection protective circuit of claim 1 further comprising a voltage dependent resistor (MOV) connected between the anode and cathode of the controlled silicon rectifier.

8. The leakage detection protective circuit of claim 1 further comprising a resistor and a capacitor connected in parallel between the control pole and cathode of the controlled silicon rectifier.

9. The leakage detection protective circuit of claim 1 wherein:
   at least the pair of power supply main circuit switches, the power supply switch, and the life termination detection switch are open when the leakage detection protective circuit is not operating, and
   at least the pair of power supply main circuit switches and the power supply switch are closed when the leakage detection protective circuit is operating.

10. The leakage detection protective circuit of claim 1 further comprising a test button, wherein:
    the power supply switch and the life termination detection switch are further linked with the test button, and
    when the test button is depressed, the power supply switch changes from a closed state to an open state and the life termination detection switch changes from an open state to a closed state.

11. A leakage detection protective circuit comprising:
    a live power output wire;
    a neutral power output wire;
    a shielding layer on at least the live power output wire and the neutral power output wire;
    a power input end comprising:
      a live wire; and
      a neutral wire;
    a rectification circuit comprising:
      a pair of AC input ends; and
      a DC power output end comprising a positive pole and a negative pole;
    a first current-limiting resistance;
    a second current limiting resistance;
    a diode;
    a controlled silicon rectifier comprising:
      a cathode;
      an anode; and
      a control pole;
    a display circuit comprising:
      a series resistor;
      a work indicator;
      a first end; and
      a second end,
    a pair of power supply main circuit switches;
    a reset button; and
    a tripping coil with a built-in iron core;
    wherein:
    the pair of power supply main circuit switches are linked with the reset button;
    the cathode of the controlled silicon rectifier is connected to the negative pole of the DC power output end of the rectification circuit,
    the anode of the controlled silicon rectifier is connected, through the tripping coil, to the positive pole of the DC power output end of the rectification circuit,
    the control pole of the controlled silicon rectifier is connected, through the first current-limiting resistance, the diode, and the second current limiting resistance, to the shielding layer of the power output wires,
    the first end of the display circuit is connected, through the tripping coil, to the positive pole of the DC power supply of the rectification circuit,
    the second end of the display circuit is connected to the neutral power output wire,
    the leakage detection protective circuit is configured so that when the reset button resets the leakage detection protective circuit, the live power output wire receives power and the work indicator is on, and
    the leakage detection protective circuit is configured so that when the reset button is in a tripped state, the work indicator is off.

12. The leakage detection protective circuit of claim 11 further comprising a master power switch, wherein:
    the master power switch has a first end and a second end, and the first end is connected to either the live wire or the neutral wire of the power input end and the second end is connected to one end of the pair of AC input ends of the rectification circuit,
    the rectification circuit operates and electrifies the entire leakage detection protective circuit, providing the leakage detection protective circuit with power and outputting power from the leakage detection protective circuit, when the master power switch is closed, and
    the entire leakage detection protective circuit is not electrified when the master power switch is open.

13. The leakage detection protective circuit of claim 12 further comprising a power supply switch linked with the reset button and a life termination detection switch linked with the reset button, wherein:
    the anode of the controlled silicon rectifier is connected, through the power supply switch and the tripping coil, to the positive pole of the DC power output end of the rectification circuit,
    the anode of the controlled silicon rectifier is connected, through the life termination detection switch and the tripping coil, to the positive pole of the DC power output end of the rectification circuit,
    the control pole of the controlled silicon rectifier is further connected, through the first current limiting resistance, the diode, a third current limiting resistance, and the life termination detection switch, to the positive pole of the DC power output end of the rectification circuit,
    the leakage detection protective circuit is configured so that when the reset button is in a tripped state, the power supply switch, the life termination detection switch, and the pair of power supply main circuit switches are all in an open state,
    the leakage detection protective circuit is configured so that when the reset button is pressed after the tripped state, the life termination detection switch closes, the power supply switch and the pair of power supply main circuit switches are in an open state, and the leakage detection protective circuit carries out a life termination detection configured to allow the reset button to be reset if a life of the leakage detection protective circuit has not terminated, and to prevent the reset button from being reset if the life of the leakage detection protective circuit has terminated, and
    the leakage detection protective circuit is configured so that when the life termination detection indicates that the life of the leakage detection protective circuit has not terminated, the power supply switch and the pair of power supply main circuit switches are in a closed status, the life termination detection switch changes from a closed state to an open state, and the live power output wire and the neutral power output wire are configured to have power.

14. The leakage detection protective circuit of claim 13 wherein:
at least the pair of power supply main circuit switches, the power supply switch, the master power switch, and the life termination detection switch are open when the leakage detection protective circuit is not operating, and
at least the pair of power supply main circuit switches and the power supply switch are closed when the leakage detection protective circuit is operating.

15. The leakage detection protective circuit of claim 11 wherein:
the leakage detection protective circuit further comprises a life termination detection switch linked with the reset button,
one end of the pair of AC power input ends of the rectification circuit is connected to the live wire of the power input end,
the other end of the pair of AC power input ends of the rectification circuit is connected to the neutral power output wire,
another AC power input end of the rectification circuit is connected, through the life termination detection switch, to the neutral wire of the power input end,
when the reset button is in a tripped or reset state, the life termination detection switch is in an open state, and
when the reset button is pressed, the life termination detection switch is closed.

16. The leakage detection protective circuit of claim 15 further comprising a test button, wherein:
the life termination detection switch is further linked with the test button,
the life termination detection switch comprises a first end, a second end, and a common end,
the first end of the life termination detection switch is connected to the neutral power output wire,
the second end of the life termination detection switch is connected, through the first current limiting resistance, the diode, and a third current limiting resistance, to the control pole of the controlled silicon rectifier, and the common end of the life termination switch is connected to the neutral wire of the power input end.

17. The leakage detection protective circuit of claim 15 further comprising a test button, wherein:
depressing the test button to a first position closes the life termination detection switch,
closing the life termination detection switch is either capable of activating the tripping coil through the controlled silicon rectifier when a life of the leakage detection protective circuit has not terminated or is not capable of activating the tripping coil through the controlled silicon rectifier when the life of the leakage detection protective circuit has terminated, and
depressing the test button to a second position causes a forced mechanical tripping of the leakage detection protective circuit.

18. The leakage detection protective circuit of claim 15 wherein:
at least the pair of power supply main circuit switches and the life termination detection switch are open when the leakage detection protective circuit is not operating, and
at least the pair of power supply main circuit switches are closed when the leakage detection protective circuit is operating.

19. A leakage detection protective circuit comprising:
a live power output wire;
a neutral power output wire;
a shielding layer on at least the live power output wire and the neutral power output wire;
a power input end comprising:
a live wire; and
a neutral wire;
a rectification circuit comprising:
a pair of AC input ends; and
a DC power output end comprising a positive pole and a negative pole;
a first current-limiting resistance;
a second current limiting resistance;
a diode;
a controlled silicon rectifier comprising:
a cathode;
an anode; and
a control pole;
a pair of power supply main circuit switches;
a reset button;
a tripping coil with a built-in iron core; and
an analog leakage current generation switch linked with the test button, the analog leakage current generation switch comprising a first end and a second end,
wherein:
the pair of power supply main circuit switches are linked with the reset button;
the cathode of the controlled silicon rectifier is connected to the negative pole of the DC power output end of the rectification circuit,
the anode of the controlled silicon rectifier is connected, through the tripping coil, to the positive pole of the DC power output end of the rectification circuit,
the control pole of the controlled silicon rectifier is connected, through the first current-limiting resistance, the diode, and the second current limiting resistance, to the shielding layer of the power output wires,
the first end of the analog leakage current generation switch is connected to either the live power output wire or the neutral power output wire, and
the second end of the analog leakage current generation switch is connected, through a leakage resistor, the diode, and the first current limiting resistance, to the control pole of the controlled silicon rectifier.

20. The leakage detection protective circuit of claim 19, comprising:
a pair of rectangular or right trapezoidal discharge sheet metals, one of which is connected to the live wire of the power input end, and the other of which is connected to the neutral wire of the power input end,
wherein:
the pair of discharge sheet metals are arranged slantways relatively with a certain spacing and comprise a pair of tips, wherein the distance between the pair of discharge sheet metals is smallest at the pair of tips.

* * * * *